US012443735B2

United States Patent
PJ et al.

(10) Patent No.: US 12,443,735 B2
(45) Date of Patent: Oct. 14, 2025

(54) METHOD AND DEVICE FOR DATA STORAGE DEVICE USER AUTHENTICATION

(71) Applicant: Sandisk Technologies, Inc., Milpitas, CA (US)

(72) Inventors: Prajual PJ, Bengaluru (IN); Penki Supriya, District Rayagada (IN); Shinoj Bhaskaran, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 151 days.

(21) Appl. No.: 18/388,513

(22) Filed: Nov. 9, 2023

(65) Prior Publication Data

US 2025/0156566 A1 May 15, 2025

(51) Int. Cl.
*G06F 21/62* (2013.01)
*H04L 9/06* (2006.01)

(52) U.S. Cl.
CPC ........ *G06F 21/6218* (2013.01); *H04L 9/0618* (2013.01)

(58) Field of Classification Search
CPC ..... G06F 21/6218; G06F 21/62; H04L 9/0618
See application file for complete search history.

(56) References Cited

U.S. PATENT DOCUMENTS

| | | | | |
|---|---|---|---|---|
| 6,356,979 | B1 * | 3/2002 | Sicola | G06F 3/0614 |
| | | | | 711/163 |
| 6,633,962 | B1 * | 10/2003 | Burton | G06F 21/805 |
| | | | | 711/170 |
| 8,990,588 | B2 | 3/2015 | Shimmitsu | |
| 2010/0185808 | A1 * | 7/2010 | Yu | G06F 13/1684 |
| | | | | 713/193 |
| 2017/0060918 | A1 * | 3/2017 | Iyer | G06F 3/0685 |
| 2022/0123932 | A1 | 4/2022 | Klapman | |

FOREIGN PATENT DOCUMENTS

JP 2013058179 A 3/2013

* cited by examiner

*Primary Examiner* — Quazi Farooqui
(74) *Attorney, Agent, or Firm* — Patent Law Works LLP (57) ABSTRACT

A data storage device comprises a non-volatile storage medium comprising at least a first logical unit configured to store encrypted user data associated with a first user and a data port configured to receive and transmit data between a host computer system and the data storage device. The data storage device is configured to receive authentication information indicating the first user; and in response to determining, based on the authentication information, that the first user is authorized to access the first logical unit: transmit, via the data port, a logical unit number associated with the first logical unit; and in response to receiving, via the data port, a read request, the read request comprising a request to read the encrypted user data stored in the first logical unit: decrypt the encrypted user data to produce plaintext user data; and transmit, via the data port, the plaintext user data.

20 Claims, 6 Drawing Sheets

METHOD AND DEVICE FOR DATA STORAGE DEVICE USER AUTHENTICATION

TECHNICAL FIELD

Aspects of the disclosure relate generally to data storage devices and, more specifically, to systems and methods for providing privacy and security for user data stored on a data storage device shared by multiple users.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

A user may use a DSD to store data that is proprietary, confidential, important or otherwise sensitive. In some situations, it is desirable to be able to share use of the DSD so that two or more users can access user data stored on the DSD. In such situations, the user data of one user may be accessible to another user of the DSD, which may lead to compromising the privacy and security of the user data. To ensure the privacy and security of their user data, before a DSD is shared with other users, a user may feel the need to take additional steps to adjust or remove their private or important user data stored on the DSD. It is therefore desired to provide a data storage device that ameliorates one or more of these difficulties, or other difficulties, of the prior art or that at least provides a useful alternative.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

Provided herein is a means to partition a storage medium into one or more logical units to provide authenticated users with tailored access to the encrypted user data stored in the logical units.

In accordance with an aspect of the present disclosure, there is provided a data storage device comprising: a non-volatile storage medium, the storage medium comprising at least a first logical unit configured to store encrypted user data associated with a first user; a data port configured to receive and transmit data between a host computer system and the data storage device; and one or more processors. The one or more processors, individually or in combination, are configured to receive, via the data port, authentication information indicating the first user. The controller is further configured to, in response to determining, based on the authentication information, that the first user is authorized to access the first logical unit: transmit, via the data port, a logical unit number associated with the first logical unit; and in response to receiving, via the data port, a read request, the read request comprising a request to read the encrypted user data stored in the first logical unit: decrypt the encrypted user data to produce plaintext user data; and transmit, via the data port, the plaintext user data.

In some embodiments, the controller is further configured to, in response to determining, based on the authentication information, that the first user is authorized to access the first logical unit: transmit, via the data port, configuration information associated with the first logical unit.

In some embodiments, the configuration information comprises one or more of: an indication of the size of the first logical unit; an indication of the user data stored in the first logical unit; an indication of an unused storage space of the first logical unit; a write access permission setting for the first user for the first logical unit; and a delete permission setting for the first user for the first logical unit.

In some embodiments, the controller is further configured to, in response to determining, based on the authentication information, that the first user is authorized to access the first logical unit, determine access permissions associated with the first user for the first logical unit.

In some embodiments, the controller is further configured to transmit, via the data port, the access permissions to the host computer system.

In some embodiments, the controller is further configured to, in response to receiving, via the data port, a data write request, the data write request comprising a request to write plaintext user data to the first logical unit, and in response to the access permissions comprising write permissions: encrypt the plaintext write data to produce encrypted write data; and write the encrypted write data to the first logical unit.

In some embodiments, the controller is further configured to, in response to receiving, via the data port, a data delete request, the data delete request comprising a request to delete a user file from the first logical unit, and in response to the access permissions comprising delete permissions, delete the user file from the first logical unit.

In some embodiments, the storage medium further comprises a second logical unit configured to store user data associated with a second user.

In some embodiments, the controller is further configured to, in response to determining, based on the authentication information, that the first user is authorized to access the second logical unit, transmit, via the data port, a logical unit number associated with the second logical unit.

In some embodiments, the data storage device is configured to store preconfigured authentication information.

In some embodiments, the controller is further configured to authenticate the first user by comparing the authentication information received via the data port with preconfigured authentication information stored in the data storage device.

In some embodiments, the controller is further configured to, in response to receiving, via the data port, a request to create a new logical unit, determine an unallocated space in the storage medium.

In some embodiments, the storage medium comprises a plurality of logical units, each of the logical units being associated with a respective logical unit number.

In some embodiments, at least one logical unit of the plurality of logical units comprises a publicly accessible logical unit.

In some embodiments, the controller is further configured to, in response to connecting to the host computer system, transmit, via the data port, configuration information associated with the publicly accessible logical unit.

In some embodiments, the controller is further configured to, in response to determining, based on the authentication information, that the first user is not authorized to access the first logical unit, transmit, via the data port, a logical unit number associated with the publicly accessible logical unit.

In some embodiments, the controller is further configured to, in response to receiving, via the data port, a request to transition to administrator mode: determine, based on the authentication information, whether the first user is an administrator user; and in response to determining, based on the authentication information, that the first user is an administrator user, transmit, via the data port, each of the respective logical unit numbers.

In some embodiments, the controller is further configured to, in response to transitioning to an administrator mode: receive, via the data port, new preconfigured authentication information; and store the new preconfigured authentication information in a non-volatile system memory of the data storage device.

In accordance with another aspect of the present disclosure, there is provided a method for transmitting data from a data storage device. The data storage device comprises: a non-volatile storage medium, the storage medium comprising at least a first logical unit configured to store encrypted user data associated with a first user; and a data port configured to receive and transmit data between a host computer system and the data storage device. The method comprises: receiving, via the data port, authentication information indicating the first user; and in response to determining, based on the authentication information, that the first user is authorized to access the first logical unit; transmitting, via the data port, a logical unit number associated with the first logical unit; and in response to receiving, via the data port, a read request, the read request comprising a request to read the encrypted user data stored in the first logical unit: decrypting the encrypted user data to produce plaintext user data; and transmitting, via the data port, the plaintext user data.

In accordance with another aspect of the present disclosure, there is provided a device for transmitting data from a data storage device. The device comprises means to: receive authentication information indicating a first user; and means to, in response to determining, based on the authentication information, that the first user is authorized to access a first logical unit; transmit a logical unit number associated with the first logical unit; and in response to receiving a read request, the read request comprising a request to read the encrypted user data stored in the first logical unit: decrypt the encrypted user data to produce plaintext user data; and transmit, via the data port, the plaintext user data.

BRIEF DESCRIPTION OF DRAWINGS

The embodiments of the disclosure will now be described with reference to the accompanying drawings, in which.

DESCRIPTION OF EMBODIMENTS

For convenience or for resource management, it may be desirable that multiple users share access to a data storage device. The DSD may be shared so that multiple users can read the same user data, so that multiple users can modify or contribute to the stored user data, or to more efficiently use the DSD in situations where there is sufficient storage space on the DSD to store the multiple users' data. For data security purposes, the user data stored on the DSD may be stored as encrypted user data by a hardware cryptography engine integrated with the DSD. Users that are authorized to use the DSD may access the stored encrypted user data via a host computer system connected to the DSD. The cryptography engine is configured to decrypt the stored user data to be provided to the authorized user(s).

In many situations, the user data (e.g. files) that are to be shared amongst multiple users are merely a subset of the user data stored on the DSD. Additionally, in many cases, the user data may be shared only for the viewing or copying purposes, without the intention that a user sharing the DSD has permission to edit or erase the stored user data.

When a DSD is shared amongst multiple users, each user has a few options to protect the privacy of their own private data. A user may remove the private data from the DSD, perhaps by transferring their private data to another DSD.

Another technique that a user may employ is to apply access limitations on a per-file basis. For example, files may be password protected, encrypted or restricted from editing. Applying access limitations on a per-file basis may be disadvantageous because the presence of a restricted file, and the file's name, remain visible to unauthorized users. Furthermore, applying access limitations on a per file basis is an overt indication that a user is subject to access limitations. Accordingly, in some situations, it is desirable that a user can utilize a DSD without an overt indication of the access limitations imposed on that user.

Alternatively, data privacy may be protected by carefully restricting the set of users who will share the DSD, or carefully limiting the type of data stored on the DSD. If the user is more concerned with the risk of another user deleting or modifying the user's data, the user may create a back-up of their data by copying their data to another storage medium.

These additional steps and limitations are a burden placed on users so that the data storage device may be shared with other users. To ameliorate this burden, aspects of the present disclosure seek to facilitate a data storage device that can be used by multiple users. This includes selectively enabling access to user data files that correspond to a user, through a user authentication process, whilst preventing access to those files by other users or other actors.

Advantageously, provided herein is a means to partition a storage medium into one or more logical units, and provide authenticated users with tailored access to the encrypted user data stored in the logical units. Furthermore, it is an advantage of the described embodiments that user data may be securely obscured from users that are not authorized to access that user data, without overt indications that the unauthorized user is prevented from accessing that user data.

Data Storage Devices

Data storage devices (DSDs) described herein may be configured to connect to a host computer system via a wired or wireless communication channel, such as a USB port. In response to connecting to the host computer system, the DSD and the host computer system may perform a discovery process which may result in the DSD registering with the host computer system as a block data storage device.

Data Storage Device

Figure 1:
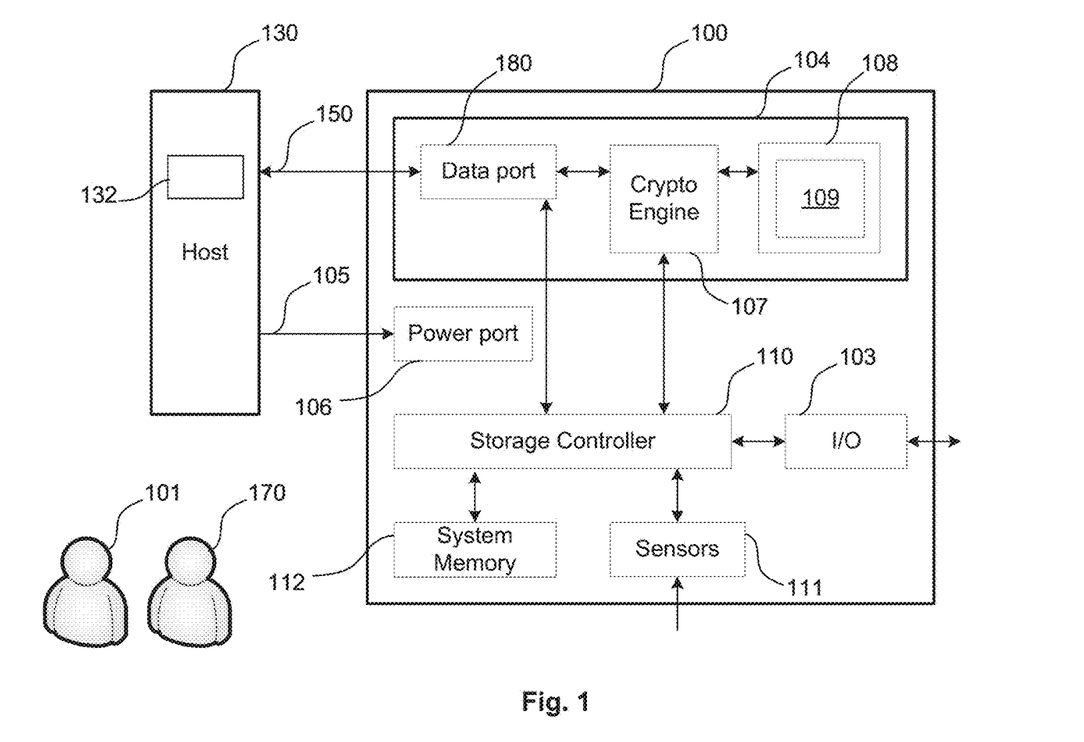
FIG. 1 illustrates a data storage device, in accordance with an embodiment.

FIG. 1 illustrates a data storage device (DSD) 100, in accordance with an embodiment. The DSD 100 comprises a data path 104 and a storage controller 110. The data path 104 comprises a data port 180 configured to transceiver (e.g. transmit, or receive, or both) data between a host computer system 130 and the DSD 100. The DSD 100 is configured to register with the host computer system 130 such as to provide functionality to the host computer system 130 of a mass storage device (e.g. a block data storage device).

DSD 100 further comprises storage medium 108 configured to store user content data 109. The user content data 109 comprises one or more blocks of data organized into one or more user files, in accordance with a particular file system operable by the host computer system 130. In examples, the user files may comprise images, documents, videos etc.

The storage medium 108 is non-volatile such as to retain the stored user content data irrespective of whether the medium 108 is powered. In embodiments, the medium 108 may comprise, a hard disk drive (HDD) with a rotating magnetic disk, a solid state drive (SSD) or its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory, such as ReRam, Phase Change Memory (PCM), and magnetoresistive random-access memory (MRAM). Further, the storage medium 108 may be a block data storage device, such that the user content data 109 is written in blocks to the storage medium 108 and read in blocks from the storage medium 108.

The storage medium 108 may be further configured to store application data, which is used by the storage controller 110. For example, application data may comprise software instructions that are executable by the controller, log files, configuration parameters and other data not intended for use by a user.

Host Computer System

The host computer system 130 comprises one or more processing components. In one embodiment, the host computer system 130 comprises a personal computer, such as a desktop computer or a laptop computer. The host computer system 130 comprises a device driver which is configured to communicate with the DSD 100 over communication channel 150. The DSD 100 is configured to receive and transmit data to the host computer system 130, over communication channel 150, via data port 180. Accordingly, communication channel 150 may be referred to as data channel 150, as this channel supports the transfer of user data between the host computer and the DSD. Data channel 150 may comprise part of a Universal Serial Bus (USB) cable.

Host Application

The host computer system comprises a host software application 132 (hereafter the 'host application'). The host application is configured to provide an interface layer between an operating system of the host application and the data storage device, in accordance with the communication protocol of the data storage device. In response to the DSD connecting to the host computer system via the data port, the host application and the DSD perform a discovery process which may result in the DSD registering with the host computer system as a block storage device.

Power Interface

In the embodiment illustrated in FIG. 1, the DSD 100 further comprises a power port 106 which is configured to receive electrical power via power interface 105. The power interface 105 may be electrically connected to the host computer system 130, such that the host computer system 130 is a power source and the power port 106 receives power from the host computer system. In another embodiment, the power interface 105 is electrically connected to a component other than the host computer system 130. The power interface 105 may comprise a wired electrical connection to a power source. The power interface 105 may comprise a wireless electrical connection to a power source.

The power port 106 and the data port 180 may be implemented collectively as, for example, some form of USB port (e.g., USB-A, USB-8, USB-C, mini-USB, micro-USB, etc.), a Thunderbolt port, a Power over Ethernet (POE) port, or a similar port. In one embodiment, the power interface 105 comprises a USB interface which is configured to supply typically 5 V at 500 mA or higher currents.

In one embodiment, the power interface 105 comprises a wireless charging interface. The wireless charging interface may utilize electromagnetic induction to provide electrical power to the DSD 100. In one embodiment, the power interface 105 electrically connects the DSD 100 to the host computer system 130. In another embodiment, the power interface 105 electrically connects the DSD 100 to a power source that is not part of the host computer system 130.

In one embodiment, the DSD 100 consumes power from the power interface 105 to operate the electronic circuitry of the DSD 100.

Users

FIG. 1 further illustrates users 101 (e.g., 'John') and 170 (e.g. 'Kim') of the DSD 100. The users may share the DSD 100 such that user data associated with each user is stored within the storage medium 108 of the DSD.

Controller

The DSD 100 further comprises a storage controller 110 (also referred to as the controller). The storage controller 110 may be comprised of one or more processors. A processor may comprise one or more microprocessors, microcontrollers or controlling circuitry. The one or more processors of the storage controller 110 are, in combination or individually, configured to execute program code stored within the system memory 112 to issue commands for controlling the operation of the DSD 100.

The system memory 112 stores device specific data, which may include a unique identifier of the DSD 100, referred to as the device identity key (IDK). The system memory 112 may store configuration information which defines the function of the DSD 100. The system memory 112 may store authentication information which may be used by the controller 110 to authenticate one or more users to perform operations on the DSD or to access the user data stored in the storage medium 108.

The function of the storage controller 110 includes, but is not limited to, controlling data transmission through data path 104, and controlling operation of the cryptography engine to direct the encryption or decryption of the user content data 109 by cryptography engine 107.

In one embodiment, the storage controller controls the operation of the cryptography engine, and the DSD, in accordance with a security protocol, such as the Trusted Computing Group (TCG) Opal Storage Specification. The TCG Opal Storage Specification comprises a set of specifications for features of data storage devices that defines ways of encrypting the stored data so that an unauthorized person who gains possession of the device cannot access the stored user data.

Cryptography Engine

The DSD 100 includes a cryptography engine 107 configured to receive, interpret and execute commands received from host computer system 104 in accordance with a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the data path 106 and the storage medium 108 and is configured to use a cryptographic key to encrypt user content data 109 to be stored on the storage medium 108, and to decrypt the encrypted user content data 109 stored on the storage medium 108.

The cryptography engine 107 is connected to the storage controller 110 and configured encrypt or decrypt user content data 109 in response to a request from the storage controller. The storage controller causes the cryptography engine 107 to control a cryptographic state of the user content data 109 (i.e., encrypted or plain). In one mode of operation, the cryptography engine is instructed, by the storage controller, to pass data through, without encryption, to be stored as plain text within the storage medium. In one mode of operation, the cryptography engine is instructed, by the storage controller, to pass unencrypted data through the data path 104 to the host computer system 130 via the data port 180.

IO Interface

The data storage device 100 may include an input/output (IO) interface 103. The IO interface 103 may include one or more input components configured to accept an input from the user 101. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to the user 101. For example, the output components may include a speaker, configured to emit audible signals, one or more visual indicators, such as a light or a display, configured to emit visual signals.

DSD Enclosure

The DSD 100 includes an enclosure configured to physically house the components of the device 100. The enclosure is formed from a rigid, or semi-rigid, material with particular properties (e.g., electrical resistance and impact strength) suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Logical Units

The storage medium may be logically divided into one or more regions, which may be referred to as logical units. A logical unit can be addressed by the host computer 130 in accordance with a data storage communication protocol, such as a storage area network (SAN) protocol like Fibre Channel (FC), Small Computer System Interface (SCSI), Internet SCSI (iSCSI), File Transfer Protocol (FTP) and other such protocols. A SAN protocol may be used by the host computer 120 to provide access to block-level data storage.

A logical unit can comprise the entire storage medium 108, or a part thereof. Each logical unit of the storage medium may be assigned a logical unit number. A LUN identifies a specific storage medium in the storage environment. In some embodiments, a LUN comprises a locally or globally unique identifier which uniquely identifies a logical partition of the storage medium.

Accordingly, each logical unit may be separately addressable by the host computer as a separate storage medium by its logical unit number (LUN). Advantageously, LUNs can enhance data storage efficiency and accessibility by distinguishing and isolating logical partitions or volumes within a storage medium or a storage system.

Advantageously, the unique identification of each of the logical partitions of the storage medium enables independent data access of the logical partition, enabling different users to interact with a storage space that is designated for that user. Furthermore, in some embodiments, access permissions can be configured on a per-logical unit basis, such that the user data stored in the logical unit may be accessed only by authorized users. In some embodiments, access permissions can be configured on a per-user basis, such that a user may have access permissions for one or more LUNs of the storage medium 108.

Logical units provide a mechanism for data organization and security within storage devices. By dividing the storage medium into distinct logical units, data isolation and access control are enforced, safeguarding sensitive information and enhancing overall data integrity. Moreover, logical units can be dynamically allocated, modified, and managed, ensuring that storage resources adapt to evolving operational needs.

This dynamic allocation capability simplifies the process of provisioning storage resources, reducing complexity and cost in data management.

Example Storage Medium

Figure 2:
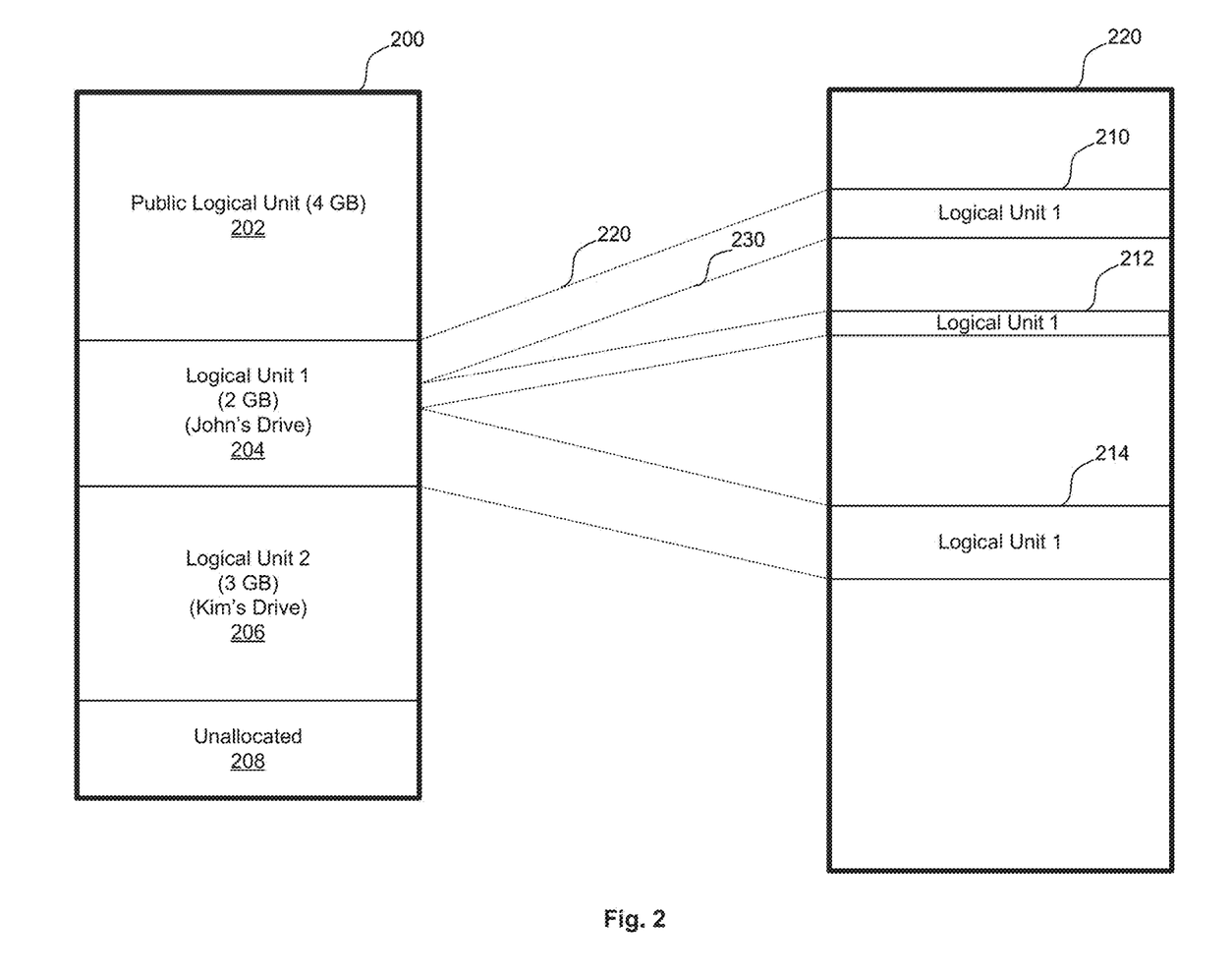
FIG. 2 illustrates a logical view of the storage medium, in accordance with an embodiment.

FIG. 2 illustrates a logical view 200 of the storage medium 108, in accordance with an embodiment. FIG. 2 also provides a pseudo-physical representation 220 of the storage medium 108, in accordance with an embodiment.

In the example of FIG. 2, the storage medium has been divided into four storage regions, three of which are logical units. In particular, the storage medium comprises: a publicly accessible logical unit 202; a logical unit 204; and a logical unit 206. The storage medium also comprises storage space 208 which has not been allocated as a logical unit.

As shown in the pseudo-physical representation 220 of the storage medium, the data storage blocks of the logical unit 204 may be located at a plurality of distributed locations within the storage medium. Similarly, the storage blocks of other logical units may be distributed within the storage medium.

Host Commands

The host computer system 130 is configured to transmit host commands to the DSD 100 via data channel 150. The host commands enable the host application to perform various operations on the data storage device, including reading and writing user data, querying device information, and managing the device's behavior.

In some embodiments, the host commands comprise USB commands. In some embodiments, the host commands comprise Small Computer System Interface (SCSI) commands. SCSI comprises a set of standards and protocols that define a communication interface for connecting and transferring data between computers and peripheral devices, such as data storage devices, hard drives, optical drives, scanners, printers, and more.

SCSI may comprise Parallel SCSI (often referred to as just SCSI), which uses parallel electrical connections for data transfer, and Serial Attached SCSI (SAS), which uses serial connections and is a more modern and faster iteration of the technology. Each SCSI standard defines a set of command protocols that devices use to communicate with the host computer or with each other, providing a standardized way to manage and access data.

States of the Controller

Figure 3:
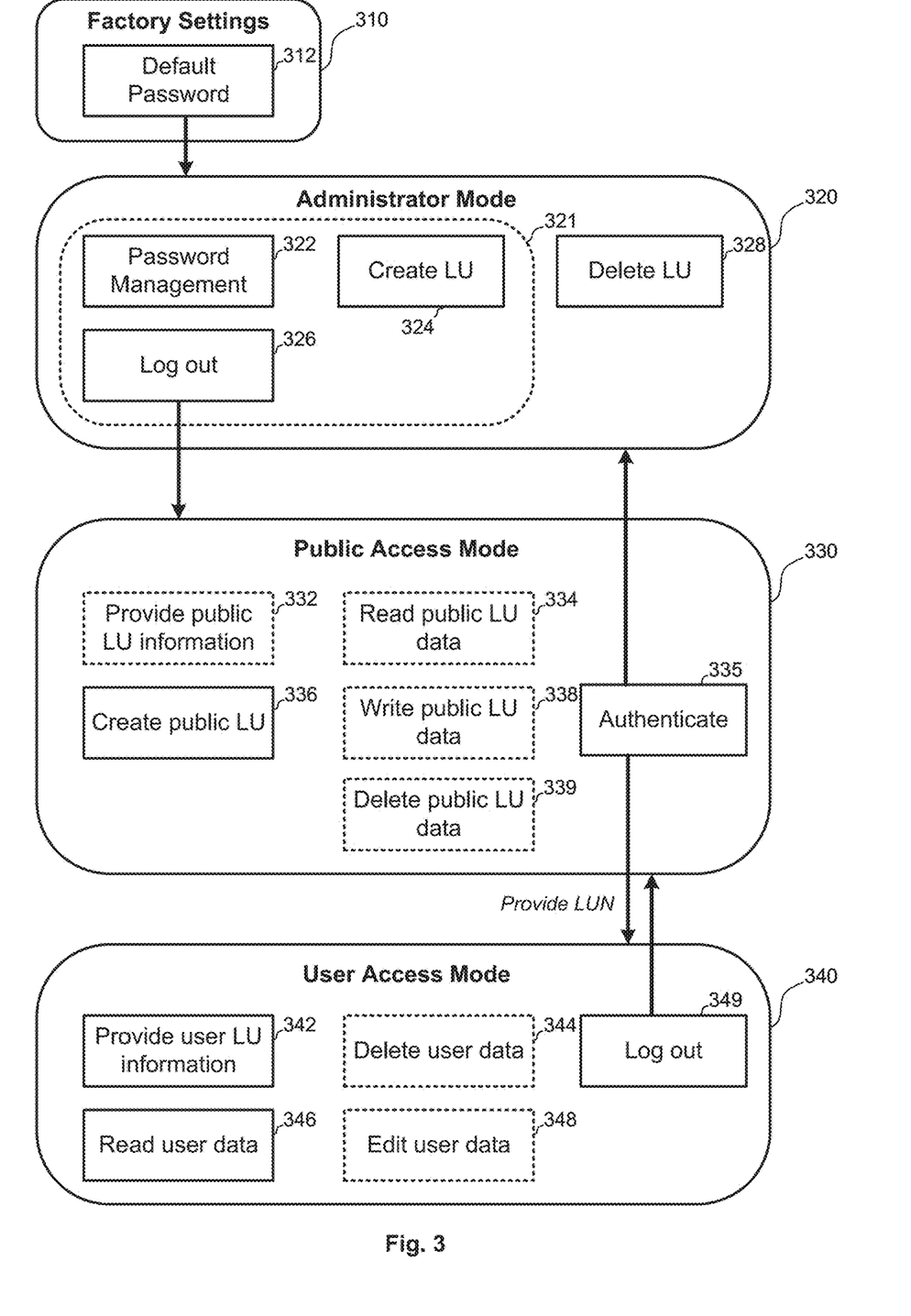
FIG. 3 illustrates operational states of the data storage device, as controlled by the controller, in accordance with an embodiment.

FIG. 3 illustrates operational states of the data storage device, as controlled by the controller, in accordance with an embodiment. The controller transitions the DSD from one operational state to another operation state in response to receiving, via the data port, control signals from the host application executing on the host computer system. The host application transmits control signals to the DSD in response to receiving input from a user of the host computer system. The host application may indicate the operation state, and other information regarding the DSD, to the user via a graphical user interface displayed by the host computer system.

On factory settings, the DSD is in the factory settings mode 310. In accordance with some embodiments, on factor settings, the storage medium of the DSD comprises a data storage medium comprising a single logical unit. This single logical unit may be configured to be publicly accessibly. This means that, without providing authentication information, users may store user data in the publicly accessible logical unit, and edit and delete the user data.

On factory settings, the DSD may not be configured with authentication information associated with any users. The DSD is, however, associated with a default password, which may be used by a user to configure the DSD on setup. The default password may be communicated to a user via the packaging associated with the DSD.

To set up the DSD for use by users, the DSD is connected to a host computer system. The host application detects the connection of the DSD to the host computer system and prompts the user of the host computer system to input the default password associated with the DSD.

Administrator Mode

In response to the user inputting the default password into the host computer, the host application communicates the default password to the data storage device via the data port 180. In response to the DSD receiving the default password, the controller 110 transitions the DSD to the administrator mode 320.

In response to the DSD being in the administrator mode 320, a user may configure an administrator password for the DSD by selecting the password management operation 322. Additionally, in the administrator mode, a user may create a logical unit within the storage medium 108 by selecting the create LU operation 324, or delete a logical unit from the storage medium by selecting the delete LU operation 328.

In some embodiments, the host application and the controller 110 are configured to provide a secondary administrator mode 321, which the DSD may transition to in response to receiving authentication information that authenticates a user assigned to perform the secondary administrator role. In some embodiments, the secondary administrator may perform all of the functions of the primary administrator, excluding the delete LU operation 328.

Setting Up a Logical Unit

A user having knowledge of the administrator password, or the secondary administrator password, may be considered an administrator user.

In response to the DSD being in the administrator mode, an administrator user can create a logical unit within the storage medium 108, so long as there is unallocated storage space in which to create the logical unit. Unallocated storage space may comprise storage space not already allocated to a logical unit and not being used to store data. Unused space within the publicly accessible logical unit may be used to create a new logical unit.

Via the host application 132, an administrator user may instruct the DSD to create a new logical unit. The administrator user can define the size of the new logical unit, which may comprise all or a portion of the unallocated storage space 208 within the storage medium.

The administrator user determines one or more users to be associated with the newly created logical unit. Furthermore, the administrator user determines authentication information associated with each of the users (e.g., a password). The host application provides this authentication information to the DSD, and the controller 110 stores the authentication information as pre-configured authentication information in system memory 112. The administrator user may also configure the access permissions of the newly created logical unit. The access permissions define what actions a user may perform on the logical unit and on the user data stored within the logical unit. Access permissions may specify whether a user is permitted to perform data modification operations such as data writes or data deletes. Access permission information may be stored in system memory 112.

An administrator user may utilize the password management operation to update the authentication information associated with a user. An administrator user may utilize the password management operation to update the access permissions associated with a user or with a logical unit.

Public Access Mode

In response to the user logging out of the administrator mode, via operation 326, the DSD transitions to the public access mode 330.

In response to the storage medium comprising one or more publicly accessible logical units 202, in the public access mode, a user can use the host application to perform a selection of operations on the one or more publicly accessible logical units without providing authentication information. The selection of operations may comprise: a read operation 334, in which the host computer system can read user data stored in the public logical unit; a write operation 338, in which the host computer system can write user data to the public logical unit; a delete operation 339, in which the host application can instruct the DSD to delete data stored in the public logical unit; a create new logical unit operation 336, in which the host application instructs the controller 110 to create a new public logical unit and format the public logical unit in accordance with a file system standard.

In response to the storage medium not comprising a publicly accessible logical unit, in the public access mode, the user is not provided with the option to perform the read operation 334, the write operation 338 or the delete operation 339. Instead, a user may utilize the create new logical unit operation 336 to create a new public logical unit and format the public logical unit in accordance with a file system standard.

Authentication

To transition to the administrator mode 320 or the user access mode 340, a user provides authentication information to the host application, and the host application provides the authentication information to the controller 110 via the data port. In response to receiving the authentication information, the controller performs the authenticate operation 335. The authenticate operation comprises comparing the authentication information received from the host application with the preconfigured authentication information stored in system memory 112.

The method by which the controller compares the authentication information may be defined by an authentication protocol selected by an administrator user or the factory settings. In one example, the authentication information comprises a password, and the authentication operation comprises a determination of whether the password matches the password stored as preconfigured authentication information.

In some embodiments, the authentication information includes user identification information: such as a username; identification number; or biometric information. In some embodiments, the authentication information includes an indication of the logical unit to which the user seeks access.

For example, John has been configured, by an administrator user, to be authorized to access logical unit 204. In response to John submitting, via the host application, authentication information, and in response to the controller successfully authenticating John's authentication information with regard to preconfigured authentication information associated with John's username, the controller transmits the logical unit number (LUN) associated with logical unit 204.

In response to the controller successfully authenticating an administrator user in operation 335, the controller transitions to the administrator mode 320.

Passwords

References to a 'password' as used herein refer generally to information which may be provided by a user to authenticate the user. Accordingly, a password may comprise: a personal identification number (PIN); a passphrase; a passcode comprising alphanumeric symbols and other symbols; or biometric information associated with the user; or any combination thereof.

User Access Mode

In response to the controller successfully authenticating a user via the authenticate operation 335, the controller transitions to the user access mode 340. A user that is authenticated by the controller in operation 335 may be considered an authenticated user. A user may be an authenticated user with regard to one or more logical units of the storage medium 108.

The operations that may be performed by the controller 110 in response to the controller being in the user access mode 340 depend on one or more of: the authenticated user; the one or more logical units associated with the authenticated user; and the access permissions associated with the authenticated user and the one or more logical units associated with the authenticated user.

In embodiments, the user access mode operations may include: a read operation 346; a data deletion operation 344; and a data modification operation 348. Additionally, a user may enquire, via the host application, configuration information regarding a logical unit. Configuration information may indicate: used space; unused space; file information; formatting information; status information; access information; or any combination thereof.

Failing to Authenticate

In response to the controller not successfully authenticating a user via the authenticate operation 335, the controller does not transition to the user access mode 340. Instead, the controller may transmit an error message to the host computer system. Notably, in response to the user not being successfully authenticated, the controller does not provide the host computer system with the logical unit numbers of any of the non-public logical units of the storage medium. Furthermore, the controller does not provide the host computer system with any configuration information regarding the non-public logical units of the storage medium. Accordingly, an unauthorized user is not provided with any information for which they are not authorized to see.

Discovery Process

In response to the DSD connecting to the host computer system, the host application 132 and the controller 110 of the DSD perform a discovery process to provide the host application with information regarding the DSD and the storage medium 108.

The format and content of the messages communicated between the host application and the controller depend upon the communication protocol by which these two entities are configured to communicate.

Figure 4:
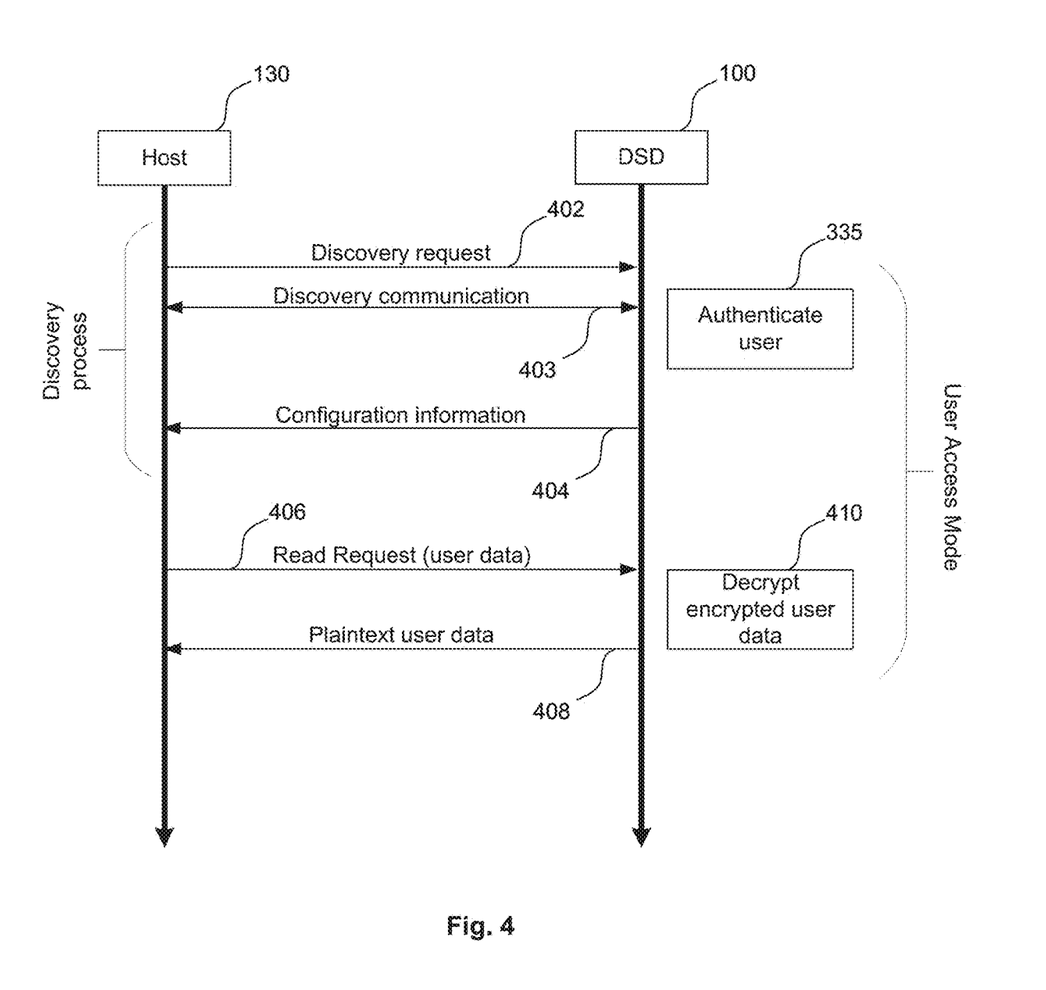
FIG. 4 illustrates a message sequence between the host computer system and the controller of the data storage device, in accordance with an embodiment.

FIG. 4 illustrates a message sequence 400 between the host computer system 130 and the controller 110 of the data storage device 100, in accordance with an embodiment. The messages communicated in the message sequence are transmitted via the communication channel 150. The messages illustrated in FIG. 4 may represent a plurality of transmissions over the communication channel. Furthermore, additional messages may be transmitted between the host computer system and the DSD that are not illustrated in FIG. 4.

In response to the DSD connecting to the host computer system, the host application transmits a discovery request message 402 to the DSD. The discovery request message may comprise authentication information. Alternatively, the controller may request that the host application provide authentication information through the transmission of subsequent discovery communication messages 403. The authentication information may comprise an indication of the user's identity.

In response to receiving the authentication information, the controller performs the authenticate operation 335 to determine whether the user is authorized to access (e.g., either read, write or delete) the user data stored in one or more of the logical units of the storage medium 108.

In response to the controller 110 determining that the user is authorized to access the user data stored in at least one of the logical units of the storage medium, the controller transmits configuration information 404 to the host application. The configuration information comprises a unique logical unit number for each of the logical units that the user is authorized to access. The configuration information may further comprise information regarding the size and contents of each of the logical units that the user is authorized to access. The configuration information may also comprise access permission information regarding the user's access permissions for each of the logical units that the user is authorized to access. The host application indicates the configuration information via a graphical user interface, so that the user can access the user data stored in the storage medium.

Advantageously, in embodiments, the configuration information does not comprise information regarding the logical units that the user is not authorized to view. Accordingly, the host application does not display information regarding the logical units that the user is not authorized to view, nor the user data stored in those logical units.

In response to receiving, from the host application, a request 406 to read user data stored in a logical unit indicated by the configuration information 404, the controller instructs the cryptography engine 107 to decrypt 410 the encrypted user data and transmit 408 the plaintext user data to the host application.

Graphical User Interface

FIGS. 5 to 8 illustrate a graphical user interface displayed to the user by the host application, in accordance with an embodiment. The host application displays interface 500 to the user in response to determining that the DSD 100 has connected to the host computer system 130.

Figure 5:
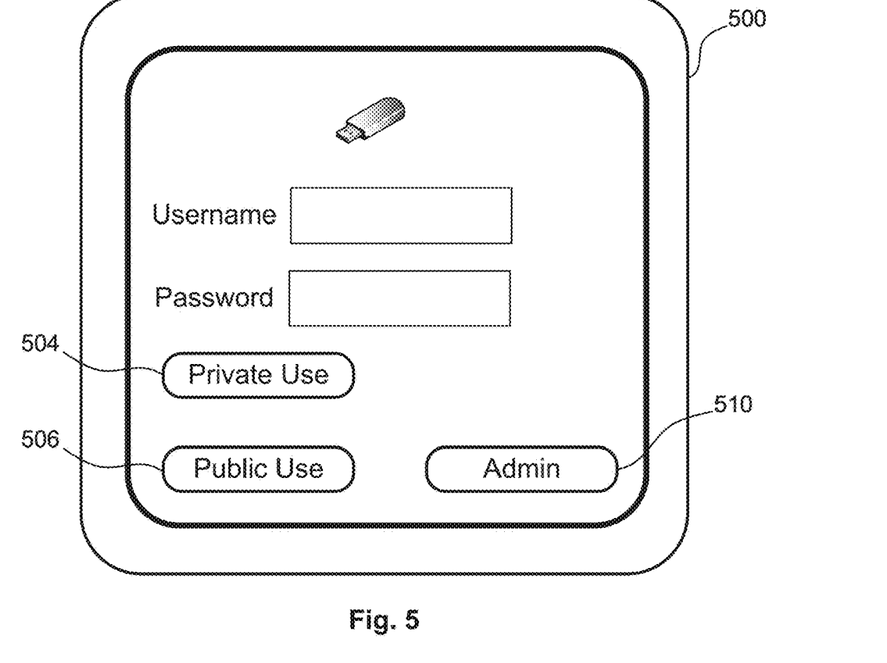
FIG. 5 illustrates a login page of a graphical user interface displayed to the user by the host application, in accordance with an embodiment.

Interface 500 prompts the user (e.g., user John 101) to provide a user identity indication (e.g. username) and authentication information (e.g. password). The user may provide these details and select button 504 to access the logical unit(s) for which the user is authorized to access.

Figure 6:
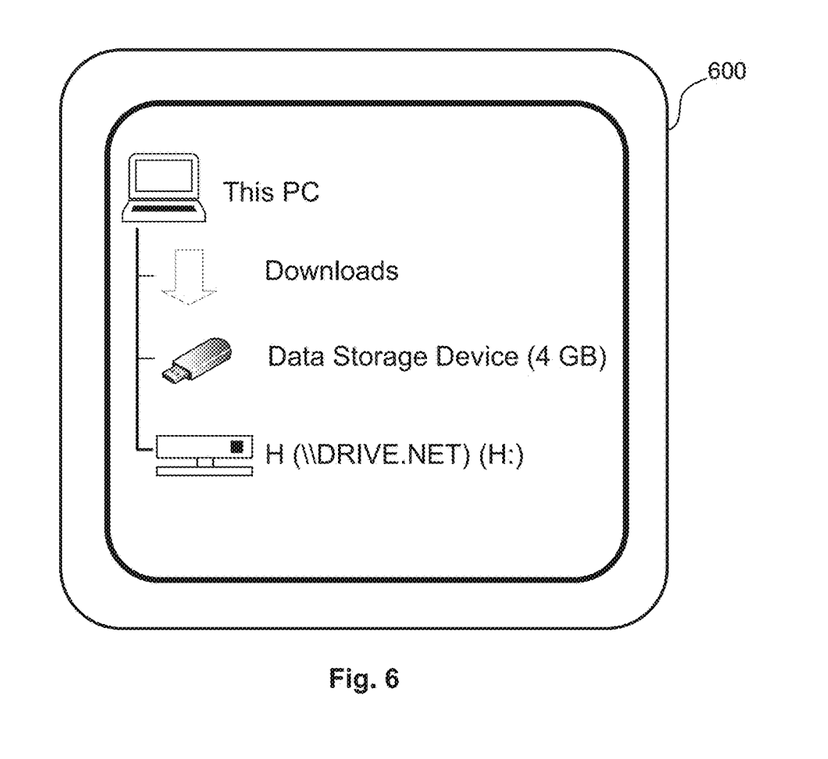
FIG. 6 illustrates a public access mode of a graphical user interface displayed to the user by the host application, in accordance with an embodiment.

Alternatively, a user may select button 506 to access a publicly accessible logical unit of the storage medium, in response to the storage medium comprising a publicly accessible logical unit. In response to a user selecting button 506, the host application performs the discovery process without authentication information. In response, the host application receives configuration information 404 defining the publicly accessible logical unit 202, which is 4 gigabytes (GB) in size. The host application displays interface 600, providing access to the 4 GB public logical unit 202.

Figure 7:
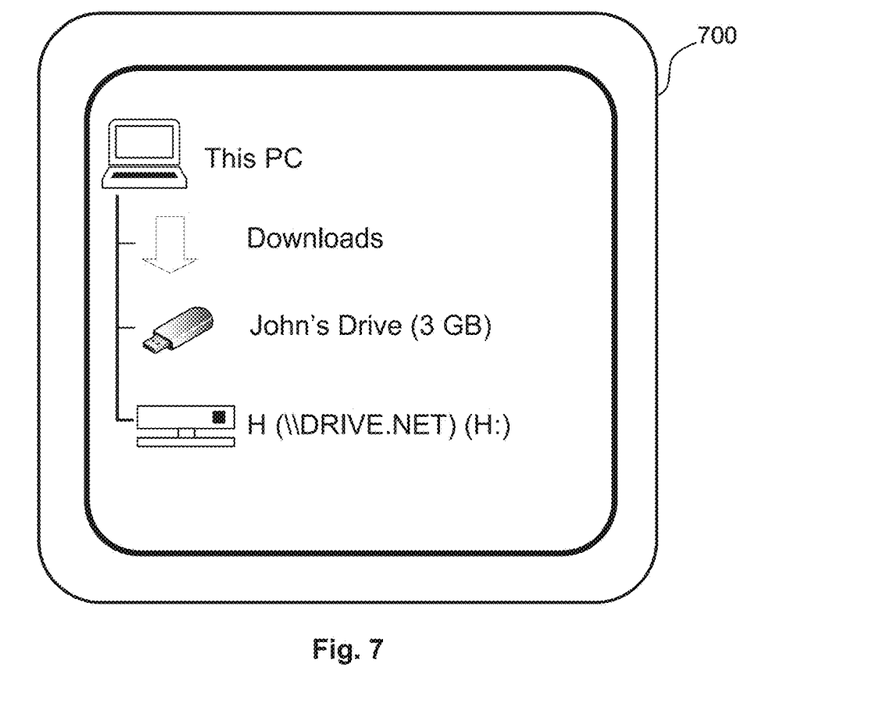
FIG. 7 illustrates a user access mode of a graphical user interface displayed to the user by the host application, in accordance with an embodiment.

In response to the user selecting button 504, and in response to the controller 110 successfully authenticating user 101 based on the authentication information, the host application receives configuration information 404 defining the logical unit 204 which user 101 is authorized to access. The host application displays interface 700, providing access to the logical unit 204 (e.g., John's drive).

Figure 8:
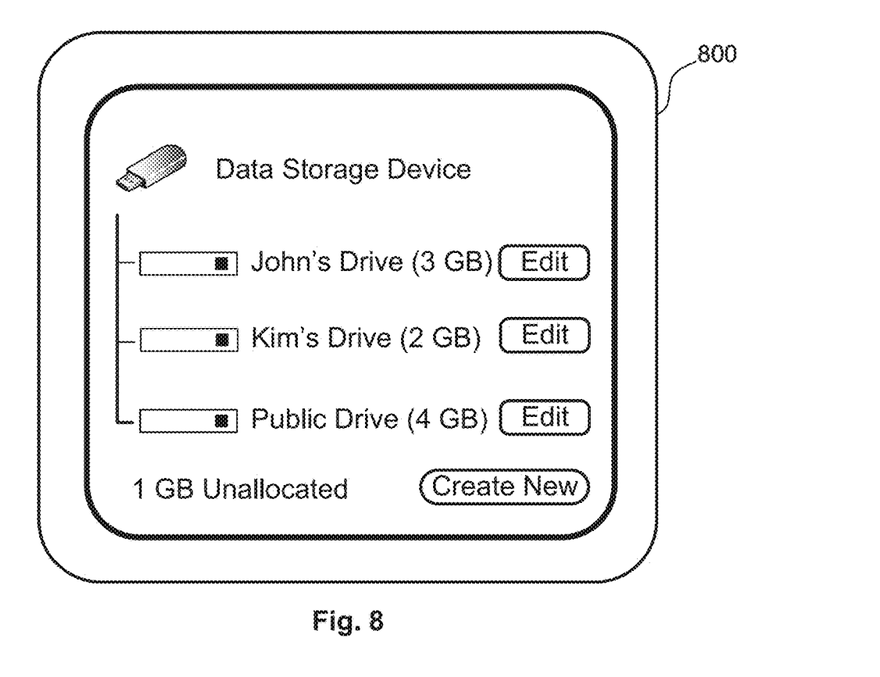
FIG. 8 illustrates an administrator view of a graphical user interface displayed to the user by the host application, in accordance with an embodiment.

In response to the user selecting button 510, and in response to the controller 110 successfully authenticating the user, based on the authentication information, as an administrator, the host application receives configuration information defining all the logical units of the storage medium. The host application displays interface 800, providing information regarding all the logical units.

It will be appreciated by persons skilled in the art that numerous variations and/or modifications may be made to the above-described embodiments, without departing from the broad general scope of the present disclosure. Furthermore, it will be appreciated by persons skilled in the art that embodiments disclosed herein can be combined with one or more other embodiment disclosed herein, without departing from the broad general scope of the present disclosure. The present embodiments are, therefore, to be considered in all respects as illustrative and not restrictive.

It will be appreciated by persons skilled in the art that any suitable distribution of functionality between different functional units may be used without detracting from the invention. For example, functionality illustrated to be performed by separate computing devices may be performed by the same computing device. Likewise, functionality illustrated to be performed by a single computing device may be distributed amongst several computing devices. Hence, references to specific functional units are only to be seen as references to suitable means for providing the described functionality, rather than indicative of a strict logical or physical structure or organization.

It will be appreciated by persons skilled in the art that, for processes and methods disclosed herein, the operations performed in the processes and methods may be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

References herein to software or executable instructions are to be understood as referring to executable instructions stored in volatile or non-volatile memory. The memory can include any data storage device that can store data which can thereafter be read by a processor. Examples of memory include read-only memory (ROM), random-access memory (RAM), magnetic tape, optical data storage device, flash storage devices, or any other suitable storage devices.

Throughout this specification the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A data storage device comprising:
   a non-volatile storage medium configured to store encrypted user data associated with a first user in a first logical unit;
   a data port configured to receive and transmit data between a host computer system and the data storage device; and
   one or more processors, individually or in combination, configured to:
      receive, via the data port, authentication information indicating the first user, wherein the authentication information is received responsive to a graphical user interface on the host computer system; and
      in response to determining, based on the authentication information, that the first user is authorized to access the first logical unit:
         transmit, via the data port, configuration information including a logical unit number associated with the first logical unit, wherein the graphical user interface is configured to selectively display, responsive to the configuration information, the configuration information for the first logical unit and not display other configuration information for at least one other logical unit in the non-volatile storage medium that is not associated with the first user; and
         in response to receiving, via the data port, a read request, the read request comprising a request to read the encrypted user data stored in the first logical unit:
            decrypt the encrypted user data to produce plaintext user data; and
            transmit, via the data port, the plaintext user data.

2. The data storage device of claim 1, wherein the host computer system is configured to, responsive to receiving the authentication information, send a discovery request message comprising the authentication information to determine logical units configured in the data storage device.

3. The data storage device of claim 1, wherein the configuration information for the first logical unit comprises one or more of:
   an indication of a size of the first logical unit;
   an indication of the encrypted user data stored in the first logical unit;
   an indication of an unused storage space of the first logical unit;
   a write access permission setting for the first user for the first logical unit; and
   a delete permission setting for the first user for the first logical unit.

4. The data storage device of claim 1, wherein the one or more processors, individually or in combination, are further configured to, in response to determining, based on the authentication information, that the first user is authorized to access the first logical unit, determine access permissions associated with the first user for the first logical unit.

5. The data storage device of claim 4, wherein the one or more processors, individually or in combination, are further configured to transmit, via the data port, the access permissions to the host computer system.

6. The data storage device of claim 4, wherein the one or more processors, individually or in combination, is further configured to, in response to receiving, via the data port, a data write request to write plaintext user data to the first logical unit and in response to the access permissions comprising write permissions:
   encrypt the plaintext user data to produce encrypted write data; and
   write the encrypted write data to the first logical unit.

7. The data storage device of claim 4, wherein the one or more processors, individually or in combination, are further configured to, in response to receiving, via the data port, a data delete request to delete a user file from the first logical unit and in response to the access permissions comprising delete permissions, delete the user file from the first logical unit.

8. The data storage device of claim 1, wherein the non-volatile storage medium further comprises a second logical unit configured to store user data associated with a second user.

9. The data storage device of claim 8, wherein the one or more processors, individually or in combination, are further configured to, in response to determining, based on the authentication information, that the first user is authorized to access the second logical unit, transmit, via the data port, a logical unit number associated with the second logical unit in the configuration information.

10. The data storage device of claim 1, wherein the data storage device is configured to store preconfigured authentication information.

11. The data storage device of claim 10, wherein the one or more processors, individually or in combination, are further configured to, authenticate the first user by comparing the authentication information received via the data port with the preconfigured authentication information stored in the data storage device.

12. The data storage device of claim 1, wherein the one or more processors, individually or in combination, are further configured to, in response to receiving, via the data port, a request to create a new logical unit, determine an unallocated space in the non-volatile storage medium.

13. The data storage device of claim 1, wherein the non-volatile storage medium comprises a plurality of logical units, each of the logical units being associated with a respective logical unit number.

14. The data storage device of claim 13, wherein at least one logical unit of the plurality of logical units comprises a publicly accessible logical unit.

15. The data storage device of claim 14, wherein the one or more processors, individually or in combination, are further configured to, in response to connecting to the host computer system, transmit, via the data port, configuration information associated with the publicly accessible logical unit.

16. The data storage device of claim 14, wherein the one or more processors, individually or in combination, are further configured to, in response to determining, based on the authentication information, that the first user is not authorized to access the first logical unit, transmit, via the data port, a logical unit number associated with the publicly accessible logical unit.

17. The data storage device of claim 13, wherein the one or more processors, individually or in combination, are further configured to, in response to receiving, via the data port, a request to transition to administrator mode:
   determine, based on the authentication information, whether the first user is an administrator user; and
   in response to determining, based on the authentication information, that the first user is an administrator user, transmit, via the data port, each of the respective logical unit numbers.

18. The data storage device of claim 17, wherein the one or more processors, individually or in combination, are further configured to, in response to transitioning to an administrator mode:
  receive, via the data port, new preconfigured authentication information; and
  store the new preconfigured authentication information in a non-volatile system memory of the data storage device.

19. A method for transmitting data from a data storage device, comprising:
  receiving, responsive to a graphical user interface of a host computer system, authentication information indicating a first user of the data storage device,
    wherein the data storage device comprises:
      a non-volatile storage medium comprising at least a first logical unit configured to store encrypted user data associated with the first user; and
      a data port configured to receive and transmit data between the host computer system and the data storage device;
  receiving, via the data port, the authentication information; and
  in response to determining, based on the authentication information, that the first user is authorized to access the first logical unit;
    transmitting, via the data port, configuration information including a logical unit number associated with the first logical unit;
    selectively displaying, by the graphical user interface and responsive to the configuration information, the configuration information for the first logical unit and not displaying other configuration information for at least one other logical unit in the non-volatile storage medium that is not associated with the first user; and
  in response to receiving, via the data port, a read request to read the encrypted user data stored in the first logical unit:
    decrypting the encrypted user data to produce plaintext user data; and
    transmitting, via the data port, the plaintext user data.

20. A data storage device comprising:
  a non-volatile storage medium configured to store, in a first logical unit, encrypted user data associated with a first user;
  a data port configured to receive and transmit data between a host computer system and the data storage device;
  means to receive, via the data port, authentication information indicating a first user wherein the authentication information is received responsive to a graphical user interface on the host computer system;
  means to, in response to determining, based on the authentication information, that the first user is authorized to access a first logical unit, transmit configuration information including a logical unit number associated with the first logical unit, wherein the graphical user interface is configured to selectively display, responsive to the configuration information, the configuration information for the first logical unit and not display other configuration information for at least one other logical unit in the non-volatile storage medium that is not associated with the first user; and
  means to, in response to receiving a read request to read the encrypted user data stored in the first logical unit:
    decrypt the encrypted user data to produce plaintext user data; and
    transmit, via the data port, the plaintext user data.

\* \* \* \* \*